(12) United States Patent
Ingram

(10) Patent No.: US 10,800,239 B2
(45) Date of Patent: Oct. 13, 2020

(54) TRANSPORTATION METHOD, SYSTEM AND COVERS

(71) Applicant: Page Transportation, Inc., Weedsport, NY (US)

(72) Inventor: Eric Paul Ingram, Morgantown, KY (US)

(*) Notice: Subject to any disclaimer, the term of this patent is extended or adjusted under 35 U.S.C. 154(b) by 83 days.

(21) Appl. No.: 16/220,944

(22) Filed: Dec. 14, 2018

(65) Prior Publication Data

US 2019/0184802 A1 Jun. 20, 2019

Related U.S. Application Data

(60) Provisional application No. 62/599,380, filed on Dec. 15, 2017.

(51) Int. Cl.
| | |
|---|---|
| *B60J 11/00* | (2006.01) |
| *B60P 7/04* | (2006.01) |
| *B60P 7/08* | (2006.01) |
| *B61D 45/00* | (2006.01) |
| *B61D 39/00* | (2006.01) |

(52) U.S. Cl.
CPC ........... *B60J 11/00* (2013.01); *B60P 7/04* (2013.01); *B60P 7/0807* (2013.01); *B60P 7/0823* (2013.01); *B60Y 2200/145* (2013.01); *B61D 39/00* (2013.01); *B61D 45/00* (2013.01)

(58) Field of Classification Search
CPC . B60J 11/00; B60P 7/04; B60P 7/0807; B60P 7/0823; B60Y 2200/145; B61D 39/00; B61D 45/00
See application file for complete search history.

(56) References Cited

U.S. PATENT DOCUMENTS

| | | | | |
|---|---|---|---|---|
| 1,784,115 A | * | 12/1930 | Sebell ................... | E04H 15/06 135/88.08 |
| 3,097,741 A | * | 7/1963 | Schwartz ............... | B22D 5/005 206/597 |
| 2004/0081543 A1 | * | 4/2004 | Brown ................... | B22D 5/005 414/796.8 |
| 2007/0138829 A1 | * | 6/2007 | Leyendecker .......... | B60J 11/00 296/136.02 |
| 2010/0282284 A1 | * | 11/2010 | Ponomarev ............. | H01L 35/16 136/200 |

* cited by examiner

*Primary Examiner* — Lori L Lyjak

(57) ABSTRACT

Transportation methods, systems and covers for transporting hot ingots or sows are disclosed. The transportation system includes a base, at least one stack of ingots, and at least one cover positioned over the at least one stack of ingots. The transportation system may also include a securement assembly configured to secure the at least one stack of ingots and at least one cover to the base. A transportation method using the transportation system to deliver hot ingots to a processing facility is also disclosed.

20 Claims, 7 Drawing Sheets

# TRANSPORTATION METHOD, SYSTEM AND COVERS

CROSS REFERENCE TO RELATED APPLICATION

This application claims priority benefit under 35 U.S.C. § 119(e) of U.S. provisional application No. 62/599,380, filed Dec. 15, 2017, which is incorporated herein by reference in its entirety.

FIELD OF THE INVENTION

The present invention relates generally to shipping methods. More specifically, but not exclusively, the present invention concerns a transportation method, system and covers for transporting hot ingots or sows.

BACKGROUND OF THE INVENTION

Currently, metals are transported in either a molten state or by forming ingots and cooling the ingots before transport. Transporting molten metals constitutes transportation of a hazardous material and can be more dangerous and costly to the transporter and consumer. Thus, many metals are transported as cooled ingots. However, when cooled ingots are used they must be re-heated when they arrive at their destination before they can be processed into the desired end product. The cooling and re-heating of the ingots results in lost time and additional energy consumption. Therefore, in order to avoid cooling and reheating or transporting liquid or molten materials, a method and system for transporting hot ingots is needed.

SUMMARY OF THE INVENTION

Aspects of the present invention provide a transportation method, system and covers for transporting hot ingots or sows.

In one aspect, provided herein is a transportation system, including a base, at least one stack of ingots, and at least one cover positioned over the at least one stack of ingots.

In another aspect, provided herein is a cover system, including a first end cover, a second end cover, and at least one intermediate cover positioned between the first end cover and the second end cover. The first end cover including a top portion, a first side portion coupled to a first end of the top portion, a second side portion coupled to a second end of the top portion opposite the first side portion, and an end portion coupled to a side of the top portion, a first side of the first side portion and a first side of the second side portion. The second end cover including a top portion, a first side portion coupled to a first end of the top portion, a second side portion coupled to a second end of the top portion opposite the first side portion, and an end portion coupled to a side of the top portion, a first side of the first side portion and a first side of the second side portion. The at least one intermediate cover overlapping at least a portion of the first end cover and at least a portion of the second end cover.

In a further aspect, provided herein is a method of transporting hot ingots, including placing a plurality of hot ingots onto a base. The method also includes placing a first end cover over a first end of the plurality of hot ingots and placing a second end cover over a second end of the plurality of hot ingots. The method further includes positioning at least one intermediate cover over the ingots between the first end cover and the second end cover.

These, and other objects, features and advantages of this invention will become apparent from the following detailed description of the various aspects of the invention taken in conjunction with the accompanying drawings.

BRIEF DESCRIPTION OF DRAWINGS

The accompanying drawings, which are incorporated in and constitute a part of the specification, illustrate embodiments of the invention and together with the detailed description herein, serve to explain the principles of the invention. The drawings are only for purposes of illustrating preferred embodiments and are not to be construed as limiting the invention. It is emphasized that, in accordance with the standard practice in the industry, various features are not drawn to scale. In fact, the dimensions of the various features may be arbitrarily increased or reduced for clarity of discussion. The foregoing and other objects, features and advantages of the invention are apparent from the following detailed description taken in conjunction with the accompanying drawings in which.

DETAILED DESCRIPTION FOR CARRYING OUT THE INVENTION

Generally stated, disclosed herein are embodiments of transportation systems, cover systems, and covers for transporting hot ingots or sows. Further, methods for transporting hot ingots or sows are also disclosed.

Figure 1:
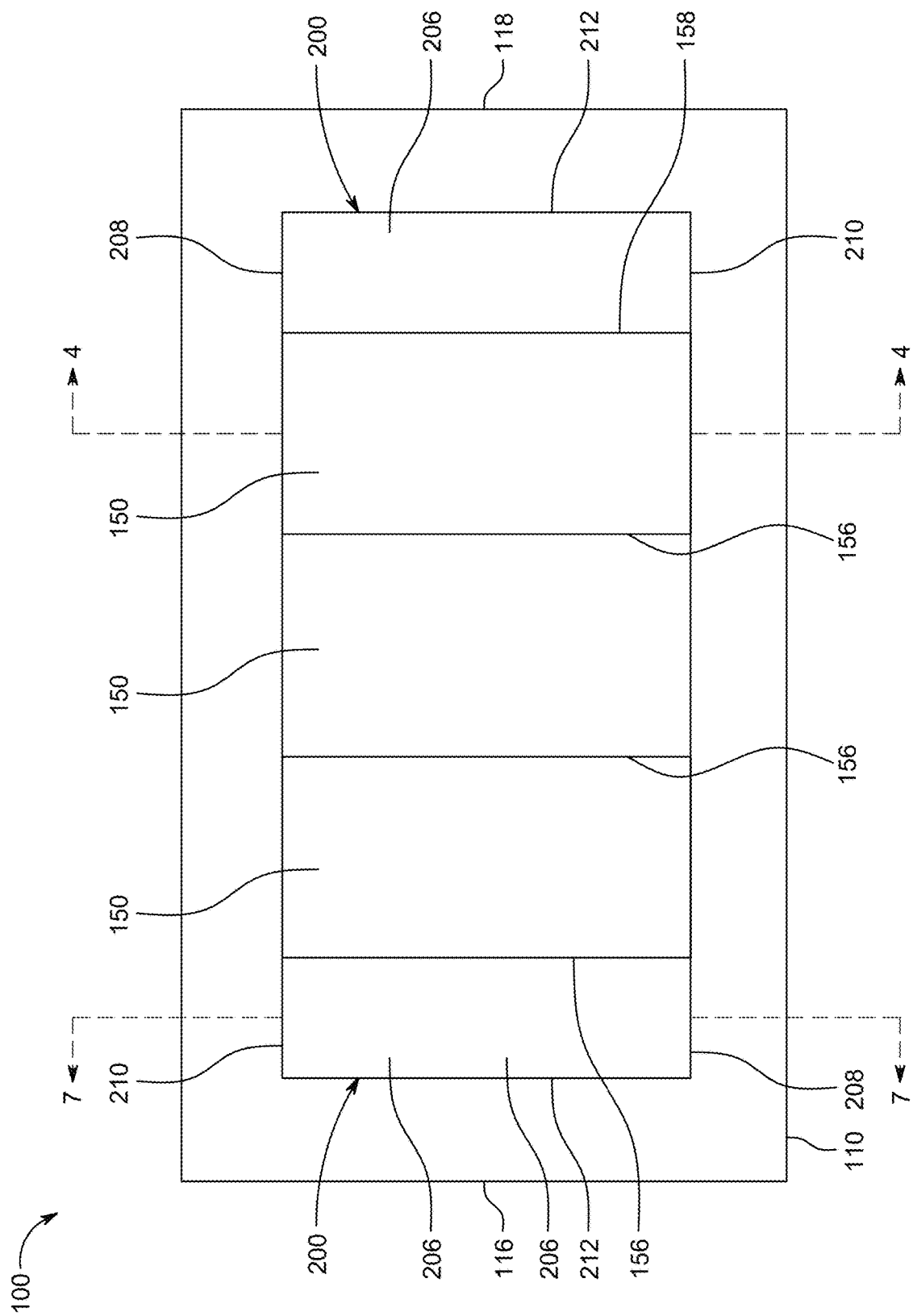
FIG. 1 is a top view of one embodiment of a partially assembled transportation system, in accordance with an aspect of the present disclosure.
Figure 2:
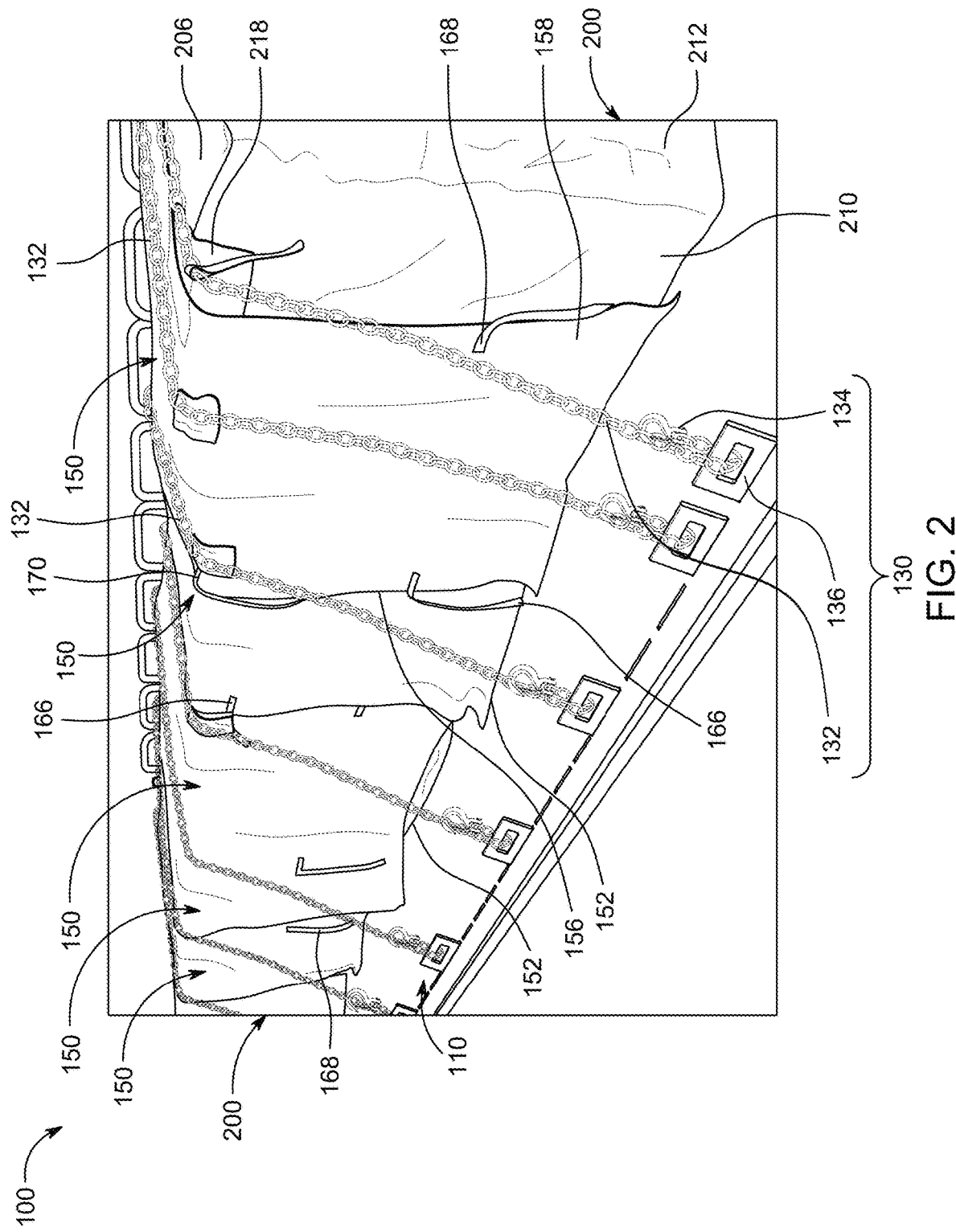
FIG. 2 is a side perspective view of a portion of a fully assembled transportation system of FIG. 1, in accordance with an aspect of the present disclosure.
Figure 4:
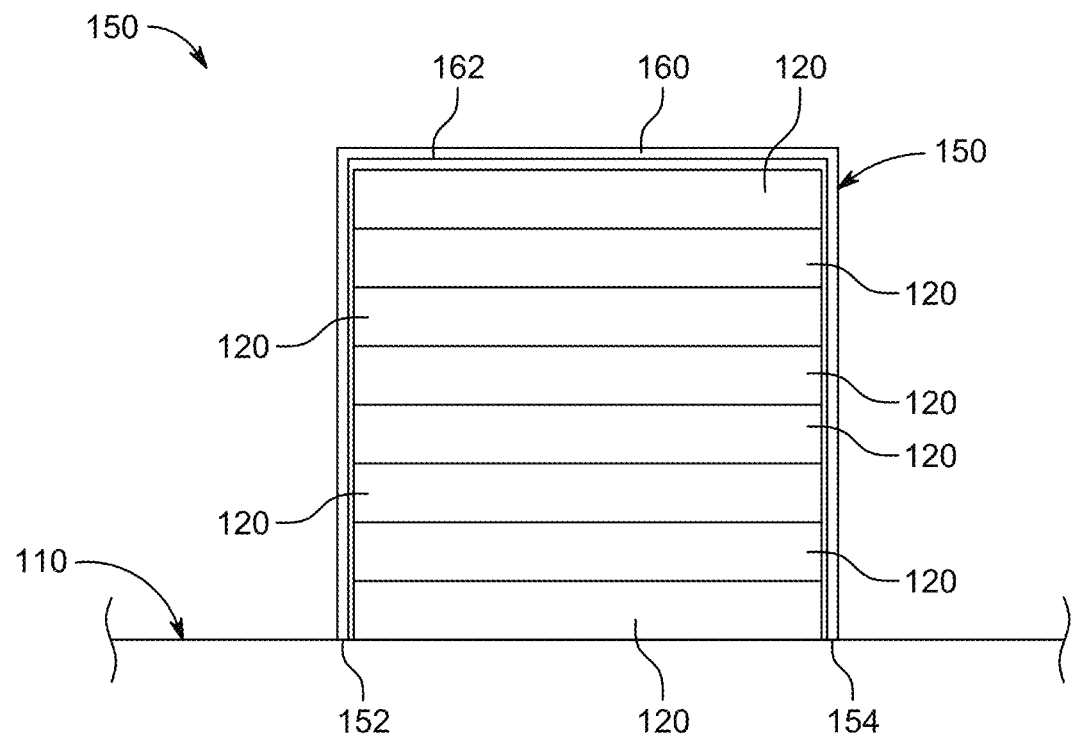
FIG. 4 is a cross-sectional view of the intermediate cover of the assembled transportation system of FIG. 1 taken along line 4-4 in FIG. 1, in accordance with an aspect of the present disclosure.
Figure 7:
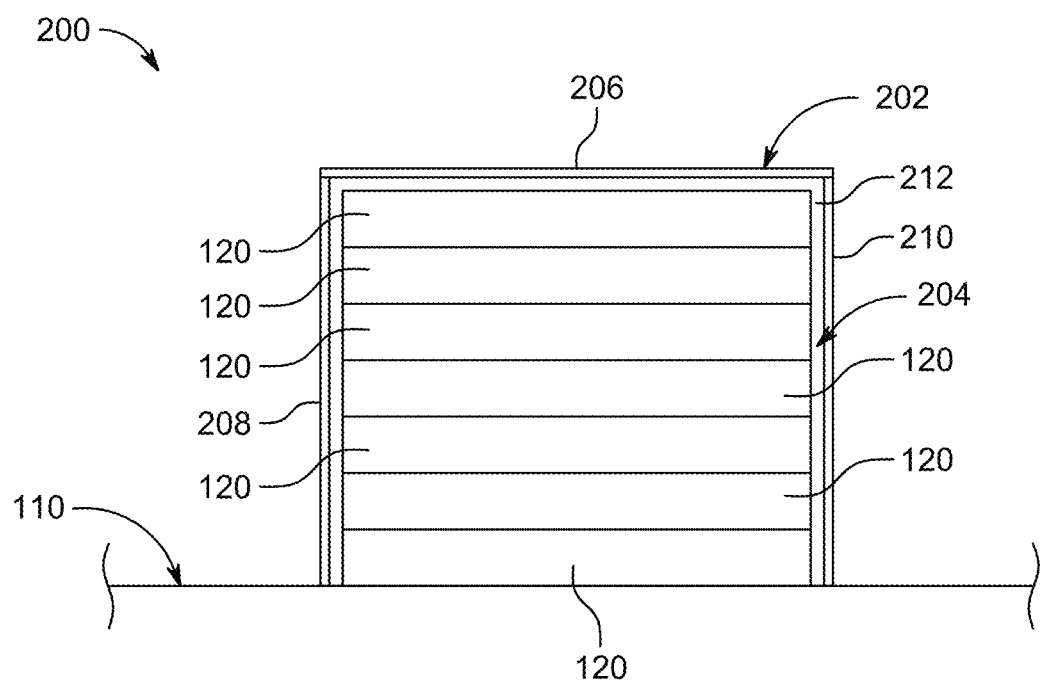
FIG. 7 is a cross-sectional view of the end cover of the assembled transportation system of FIG. 1 taken along line 7-7 in FIG. 1, in accordance with an aspect of the present disclosure.

Referring to the drawings, wherein like reference numerals are used to indicate like or analogous components throughout the several views, and with particular reference to FIGS. 1 and 2, there is illustrated an exemplary embodiment of a transportation system 100. The transportation system 100 may be used to transport hot ingots 120, as shown in FIGS. 4 and 7, from a foundry or processing facility to a production facility to be used to make an end product. The transportation system 100 may include a base 110, a plurality of stacked hot ingots or sows 120, as shown in FIGS. 4 and 7, at least one intermediate cover 150, and at least two end covers 200. The transportation system 100 may also include a securement or strapping assembly 130, as shown in FIG. 2, to secure the ingots 120 and covers 150, 200 to the base 110. The terms "ingot," "sow," "billet," "bloom," "logs," and "slab" may be used interchangeable herein to refer to a formed block of metal which may be formed at a plant or foundry and then transported to another location for processing into an end product. The ingots may be independent or bundled. The covers 150, 200 may also optionally include, for example, protection members 170, 218 positioned on the edges of the covers 150, 200 where the securement assembly 130 engages the cover 150, 200. The protection members 170, 218 may prevent damage to the covers 150, 200 or direct contact of the securement assembly 130 with the ingots 120. The protection members 170, 218 may optionally include, for example, slits (not shown) for inserting the securement assembly 130 through to further secure the securement assembly 130 to the covers 150, 200 without contacting the ingots 120.

As shown in FIG. 2, the securement assembly 130 may include, for example, an attachment member 132, at least one locking member 134 on at least one end of the attachment member 132, and a base coupling member 136 configured to receive the locking member 134. The attachment member 132 may be used to secure the ingots 120 and covers 150, 200 to the base 110. The attachment member 132 may be, for example, a chain, wire, rope, strap, ratchet strap, or like member that may extend over the top of the covers 150, 200 on the ingots 120 to prevent the ingots 120 from sliding off of the base 110. The attachment member 132 may also be, for example, temperature rated to withstand up to at least 500°. The at least one locking member 134 may be, for example, a hook, clamp, latch, or a like device for attaching the attachment member 132 to the base 110. The base coupling member 136 may also be configured or sized and shaped to couple to the base 110. The base coupling member 136 may have, for example, a first coupling feature on a first side to receive the attachment member 132 or a locking member 134 and a second coupling feature on a second side to engage the base 110. Alternatively, the base coupling member 136 may be, for example, an integral part of the base 110, which may receive the locking member 134 or a portion of the attachment member 132.

Figure 3:
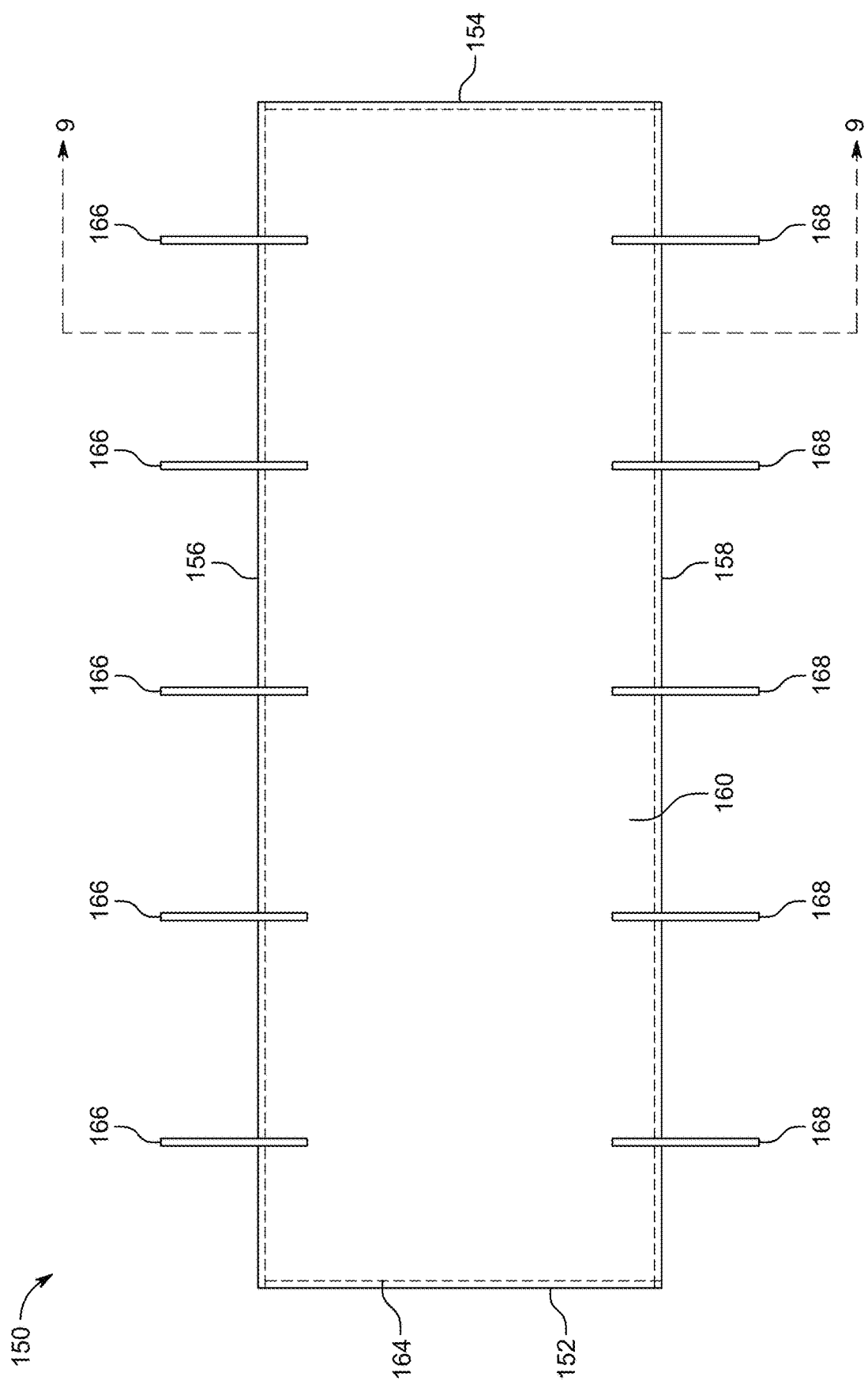
FIG. 3 is a top view of an intermediate cover of the transportation system of FIG. 1 in a flat position, in accordance with an aspect of the present disclosure.
Figure 9:
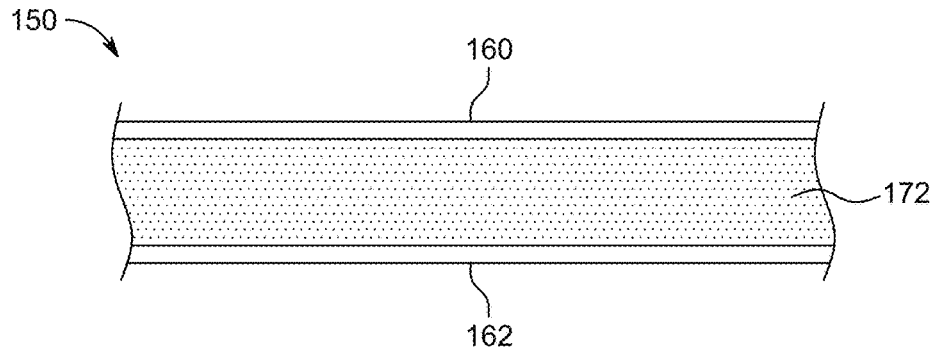
FIG. 9 is a cross-sectional view of the intermediate cover of FIG. 5 taken along line 9-9 in FIG. 3.

Referring now to FIGS. 3 and 4 with continued reference to FIGS. 1 and 2, the intermediate or center covers 150 may include a first side 152 opposite a second side 154. The intermediate covers 150 may also include a first end 156 opposite a second end 158 and a top surface or first outer layer 160 opposite a bottom surface or second outer layer 162. Referring now to FIG. 9, the intermediate covers 150 may also include an insulating material or fiber fill 172 positioned between the first outer layer 160 and the second outer layer 162. The outer layers 160, 162 may be, for example, a cloth or silicon based material designed to withstand the high temperatures of the ingots 120, such as fiberglass, vermiculite cloth, or the like as known by one of ordinary skill in the art. In addition, the insulating material 172 may be, for example, a ceramic fiber with alumina silica, fire brick insulation material, ceramic material, or a like fiber fill material designed to retain high temperatures in the contacted article, as known by one or ordinary skill in the art. The intermediate cover 150 may further include, for example, stitching 164 to secure the outer layers 160, 162 and the insulating material 172 together. The stitching 164 may be positioned, for example, to assemble the intermediate covers 150 to have the highest degree of insulating properties.

In addition, the intermediate covers 150 may also optionally include a plurality of first straps or coupling members 166 positioned on the first end 156 of the covers 150 and a plurality of second straps or coupling members 168 positioned on the second end 158 of the covers 150, as shown in FIG. 3. The straps or coupling members 166, 168 may, for example, engage an adjacent strap or coupling member 166, 168, an end strap 214, or directly engage an adjacent cover 150, 200 to assist with forming an insulating barrier over the ingots 120. The straps 166, 168 may include, for example, Velcro® or another material which engages the covers 150, 200 without requiring a knot to be tied between two straps 166, 168 for securement. The straps 166, 168 may also be, for example, temperature rated to withstand temperatures up to at least 500° without being compromised. As shown in FIG. 2, the intermediate covers 150 may also include, for example, at least one securement protector or protection member 170 positioned on the top surface 160 of the intermediate covers 150. The protection member 170 provides, for example, a contact surface for the strapping assembly 130. The protection member 170 may be positioned, for example, on the intermediate covers 150 over the corners of the ingots 120.

As shown in FIG. 4, the intermediate covers 150 may be, for example, sized and shaped or have a length to be draped or placed directly over the ingots 120 such that the first and second sides 152, 154 directly contact the base 110. When the intermediate covers 150 are positioned over the ingots 120, the intermediate covers 150 form three portions, for example, a top portion, a first side portion and a second side portion. The top portion of the intermediate covers 150 contacts the tops of the ingots 120. The first side portion of the intermediate covers 150 contacts a first end of the ingots 120 and the second side portion of the intermediate covers 150 contacts a second end of the ingots 120. The width of the intermediate covers 150 may be, for example, selected to cover at least one row of ingots 120 and overlap at least a portion of the adjacent ingots 120. Alternative intermediate cover widths are also contemplated based on load sizes.

Figure 5:
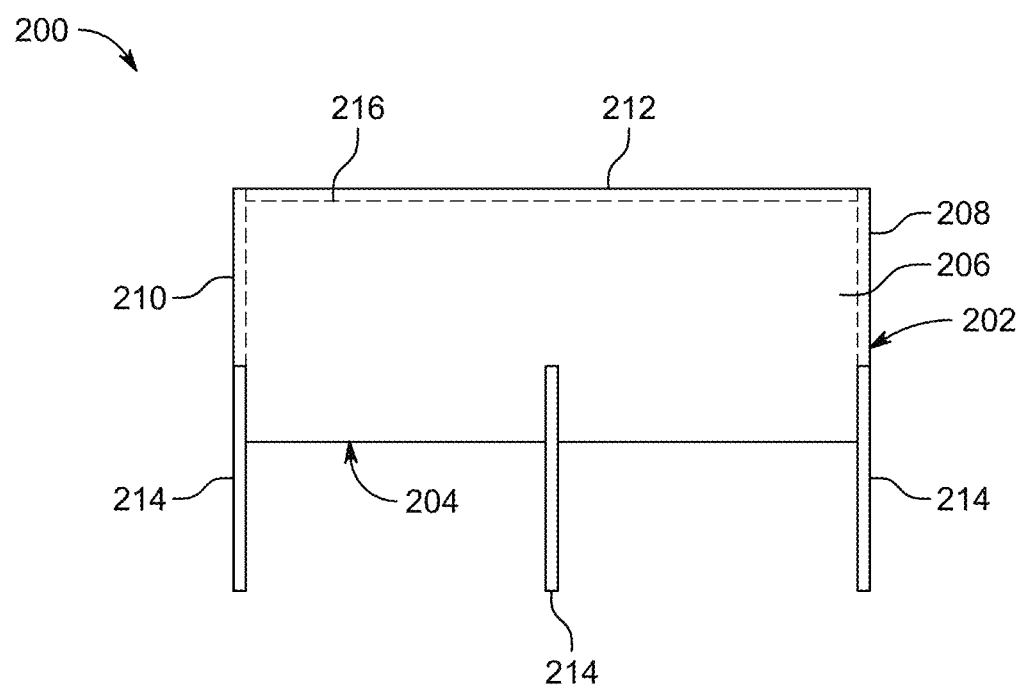
FIG. 5 is a top view of an end cover of the transportation system of FIG. 1 in a deployed position, in accordance with an aspect of the present disclosure.
Figure 8:
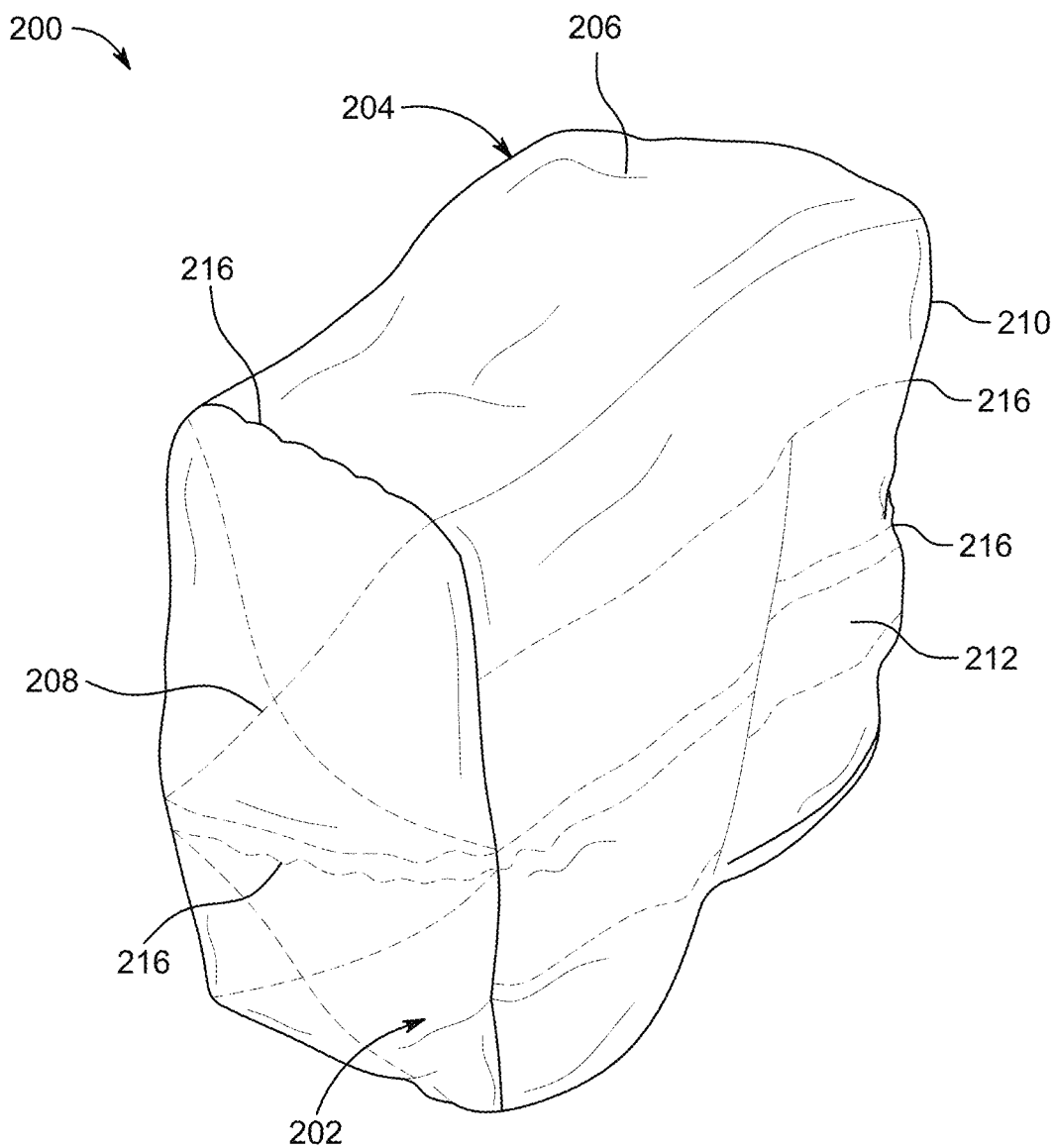
FIG. 8 is an end perspective view of the end cover of FIG. 5, in accordance with an aspect of the present disclosure.

Referring now to FIGS. 5-8 and with continued reference to FIGS. 1 and 2, the end covers or end caps 200 may include an exterior surface or layer 202 opposite an interior surface or layer 204. The end covers 200 may also include a top portion 206 with a first side 208 coupled to a first end and a second side 210 coupled to a second end, as shown in FIGS. 5, 7 and 8. In addition, the end covers 200 may include an end portion 212. The top of the end portion 212 may be coupled to one side of the top portion 206, a first side of the end portion 212 may be coupled to an end of the first side 208, and a second side of the end portion 212 may be coupled to an end of the second side 210, as shown in FIG. 8. The assembled end covers 200 provide four surfaces for contacting the ingots 120 and may be placed, for example, on the first and last stacks of ingots 120 positioned on the base 110 for transport. The end covers 200 may also include an insulating material or fiber fill (not shown) positioned between the exterior layer 202 and the interior layer 204. The exterior layer 202 and interior layer 204 may be, for example, a cloth or silicon based material designed to withstand the high temperatures of the ingots 120, such as fiberglass, vermiculite cloth, or the like as known by one of ordinary skill in the art. In addition, the end covers 200 may include an insulating material (not shown) between the exterior layer 202 and the interior layer 204. The insulating material may be, for example, a ceramic fiber with alumina silica, fire brick insulation material, ceramic material, or a like fiber fill material designed to retain the high temperatures in the contacted article as known by one of ordinary skill in the art. The end cover 200 may further include, for example, stitching 216 to secure the exterior layer 202, interior layer 204, and the insulating material (not shown) together. The stitching 216 may be positioned, for example, to assemble the end covers 200 to have the highest degree of insulating properties.

Figure 6:
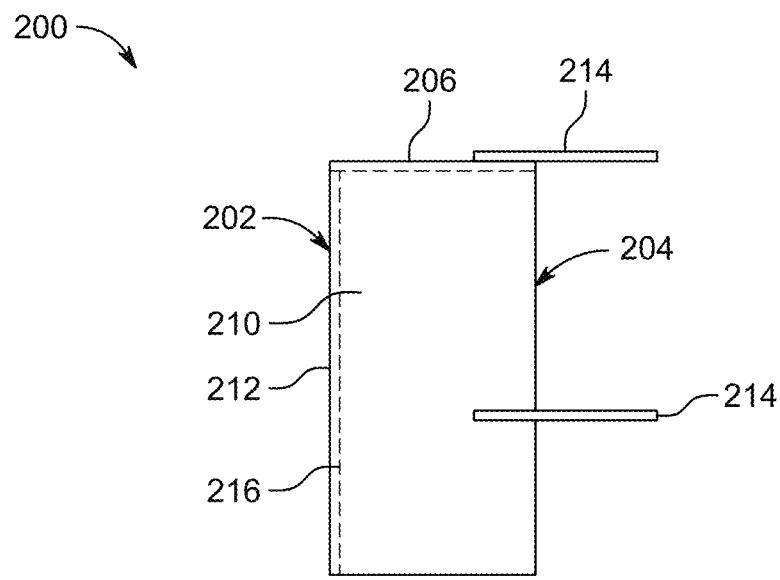
FIG. 6 is a side view of the end cover of FIG. 5, in accordance with an aspect of the present disclosure.

As shown in FIGS. 5 and 6, the end covers 200 may also include a plurality of end straps or end coupling members 214. The end straps 214 may be positioned and coupled to the side of the top portion 206 and sides 208, 210 of the end cover 200 opposite the end portion 212. The end straps 214 may overlap with at least a portion of the exterior surface 202 of the end covers 200. The end straps 214 may, for example, engage an adjacent strap or coupling member 166, 168 or directly engage an adjacent cover 150, 200 to assist with forming an insulating barrier over the ingots 120. The end straps 214 may include, for example, Velcro® or another material which engages the covers 150 without requiring a knot to be tied between the end straps 214 and straps 166, 168 for securement. As shown in FIG. 2, the end covers 200 may also include at least one securement protector or protection member 218 positioned on the exterior surface 202 of the end covers 200. The protection member 218 provides, for example, a contact surface for the strapping assembly 130. The protection member 218 may be positioned, for example, on the end covers 200 over the corners of the ingots 120.

As shown in FIG. 7, the end covers 200 may be, for example, sized and shaped to be placed directly over a stack of ingots 120 such that the bottoms of the first and second sides 208, 210 directly contact the base 110. When the end covers 200 are positioned over the ingots 120, the top portion 206 contacts the top of the stack of ingots 120, the first side 208 contacts a first side of the stack of ingots 120, the second side 210 contacts a second side of the stack of ingots 120, and the end portion 212 contacts an end of the stack of ingots 120. The width of the top portion 206 of the end covers 200 may be, for example, selected to cover at least one stack of ingots 120 and overlap at least a portion of the adjacent ingots 120.

Although not shown, it is also contemplated that the intermediate covers 150 and end covers 200 may be coupled together to form a single or one piece cover with an opening on the bottom for placing over the stacks of ingots 120 positioned on a base 110. The single or one piece cover may also be, for example, a shell or box, such as a steel box to cover the stacks of ingots 120. Another alternative embodiment also contemplated for transporting hot ingots 120 includes, for example, transporting the hot ingots 120 in an enclosed and heated trailer.

Figure 10:
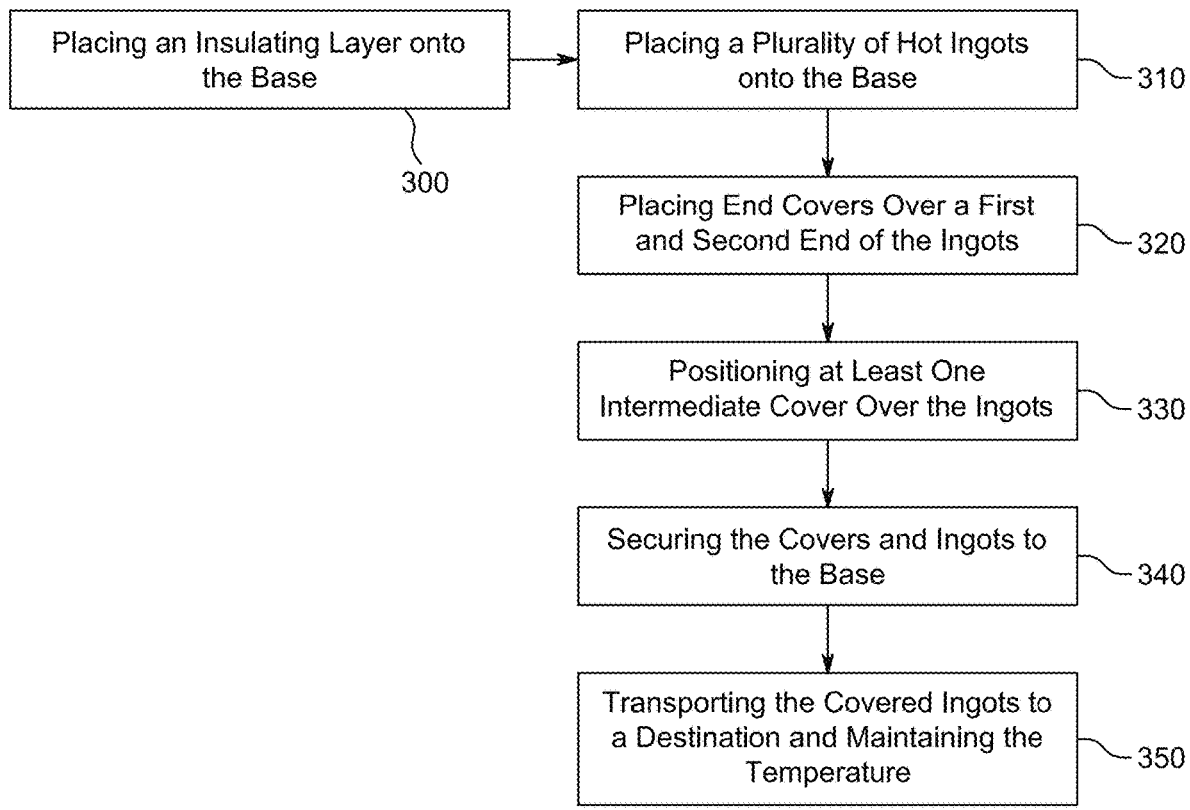
FIG. 10 depicts one embodiment of a method for transporting hot ingots, in accordance with an aspect of the present disclosure.

With continued reference to FIGS. 1 and 2 and with reference to FIG. 10, a method of using the transportation system 100 is shown. For example, in one embodiment the method may optionally include, placing an insulating layer onto the base 300. The method may also include placing a plurality of hot ingot or sow stacks onto the base 310. The hot ingots or sow stacks may be, for example, placed directly or indirectly onto the base. Specifically, the hot ingot stacks may be, for example, placed onto the insulating layer on the base or placed directly onto the base. In addition, the method may include placing a first end cover over the first stack of ingots at the first end of the base and a second end cover over the last stack of ingots at the second end of the base 320. The method may further include positioning at least one intermediate cover over the stacks of ingots 330. Next, the method may include securing the covers and stacks of ingots to the base 340. Finally, the method includes transporting the covered ingots to a destination and the maintaining the hot temperature 350.

More specifically, the method of FIG. 10 may include, for example, optionally placing an insulating layer, for example, a plurality of the intermediate covers 150 on the base 110. The base 110 may be, for example, a flatbed for a tractor trailer, train, or like transportation method. A plurality of stacked hot ingots 120 may be placed, for example, onto the bottom insulating layer or directly onto the base 110. The ingots 120 may have, for example, an initial temperature ranging from approximately 400° F. to 500° F. for aluminum materials. In one embodiment, the method may also include placing edge protectors directly onto the top exterior edges of the ingots 120. Then, a first end cover 200 may be placed over the ingots 120 at the first end 116 and a second end cover 200 may be placed over the ingots 120 at the second end 118. Next, a plurality of intermediate covers 150 may be placed over the ingots 120 between the end covers 200. The intermediate covers 150 may overlap each other and the end covers 200 to fully cover the ingots 120. After the covers 150, 200 are positioned on the stacks of ingots 120, the covers 150, 200 and ingots 120 may be secured to the base for transportation. The covers 150, 200 may be secured together on the tops and sides using the plurality of coupling members 166, 168, 214, as discussed in greater detail above and which will not be described again here for brevity sake.

Next, a strapping assembly 130 may be used to secure the covers 150, 200 and ingots 120 to the base 110. The attachment member 132 of the strapping assembly 130 may be placed over the tops of the covers 150, 200. Next, the locking members 134 may secure the attachment member 132 to the base coupling member 136. The base coupling member 136 may be coupled to the base 110 prior to or after the locking members 134 secure the attachment member 132 to the base coupling member 136. The strapping assembly 130 may include a single locking member 134, which may be secured on one side of the base 110 or, alternatively, the strapping assembly 130 may include two locking members 134 with a first locking member 134 secured to the first side of the base 110 and a second locking member 134 secured to the second side of the base 110. After the stacks of ingots 120 and covers 150, 200 are secured to the base 110, the assembled transportation system 100 may be transported to the destination for processing the ingots 120. In an embodiment, the ingots 120 may have, for example, a delivered temperature of at least 250° F. or ranging from approximately 250° F. to 500° F., more specifically, the delivered temperature will range from approximately 275° F. to 300° F. for aluminum materials. Alternative temperature ranges are also contemplated for ingots made of other materials, as would be understood by one of ordinary skill in the art. Once the stacks of ingots 120 arrive at their destination they may be uncovered and removed from the base 110, then, they may be immediately processed because they arrived at the heated temperature necessary for processing.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has", and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The invention has been described with reference to the preferred embodiments. It will be understood that the architectural and operational embodiments described herein are exemplary of a plurality of possible arrangements to provide the same general features, characteristics, and general system operation. Modifications and alterations will occur to others upon a reading and understanding of the preceding detailed description. It is intended that the invention be construed as including all such modifications and alterations.

Having thus described the preferred embodiments, the invention is now claimed to be:

1. A transportation system, comprising:
   a base;
   at least one stack of ingots;
   at least one cover positioned over the at least one stack of ingots; and
   a securement assembly engaging the at least one cover to couple the at least one stack of ingots and at least one cover to the base.

2. The transportation system of claim 1, wherein the at least one cover comprises:
   a first end cover positioned on a first end of the at least one stack of ingots;
   a second end cover positioned on a second end of the at least one stack of ingots; and
   an intermediate cover positioned between the first end cover and second end cover.

3. The transportation system of claim 2, wherein the at least one intermediate cover overlaps the first end cover and the second end cover.

4. The transportation system of claim 2, wherein the intermediate cover further comprises:
   a plurality of first straps positioned on a first end of the intermediate cover; and
   a plurality of second straps positioned on a second end of the intermediate cover.

5. The transportation system of claim 2, wherein the intermediate cover comprises:
   a first layer;
   a second layer; and
   an insulating layer positioned between the first layer and the second layer;
   wherein the second layer is made of a heat resistant material.

6. The transportation system of claim 5, wherein the intermediate cover further comprises:
   at least one protection member positioned on an exterior surface of the first layer.

7. The transportation system of claim 2, wherein the first end cover and second end cover each comprise:
   a top portion;
   a first side portion coupled to a first end of the top portion;
   a second side portion coupled to a second end of the top portion opposite the first side portion; and
   an end portion coupled to a side of the top portion, a first side of the first side portion and a first side of the second side portion.

8. The transportation system of claim 7, wherein the first end cover and second end cover each further comprise:
   a plurality of end straps positioned on the top portion on a side opposite the end portion, on a second side of the first side portion, and on a second side of the second side portion.

9. The transportation system of claim 1, wherein the securement assembly comprises:
   an attachment member engaging the at least one cover between a first end and a second end;
   at least one locking member coupled to at least one end of the attachment member; and
   at least one base coupling member coupled to the base on a first end and configured to receive at least one of the at least one locking member and the attachment member.

10. A cover system, comprising:
    a first end cover, the first end cover comprising:
       a top portion;
       a first side portion coupled to a first end of the top portion;
       a second side portion coupled to a second end of the top portion opposite the first side portion; and
       an end portion coupled to a side of the top portion, a first side of the first side portion and a first side of the second side portion;
    a second end cover, the second end cover comprising:
       a top portion;
       a first side portion coupled to a first end of the top portion;
       a second side portion coupled to a second end of the top portion opposite the first side portion; and
       an end portion coupled to a side of the top portion, a first side of the first side portion and a first side of the second side portion; and
    at least one intermediate cover positioned between the first end cover and second end cover, wherein the intermediate cover overlaps at least a portion of the first end cover and at least a portion of the second end cover.

11. The cover system of claim 10, wherein the at least one intermediate cover comprises:
    a first layer;
    a second layer; and
    an insulating layer positioned between the first layer and the second layer;
    wherein the second layer is made of a heat resistant material.

12. The cover system of claim 11, wherein the at least one intermediate cover further comprises:
    at least one protection member positioned on an exterior surface of the first layer.

13. The cover system of claim 10, wherein the first end cover comprises:
    at least one first protection member positioned on an exterior surface of at least one of the top portion, the first side portion and the second side portion; and
    wherein the second end cover comprises:
    at least one second protection member positioned on an exterior surface of at least one of the top portion, the first side portion and the second side portion.

14. A transportation method, comprising:
    placing a plurality of hot ingots onto a base;

placing a first end cover over a first end of the plurality of hot ingots;

placing a second end cover over a second end of the plurality of hot ingots; and positioning at least one intermediate cover over the ingots between the first end cover and the second end cover.

15. The transportation method of claim 14, wherein the at least one intermediate cover overlaps at least a portion of the first end cover and at least a portion of the second end cover.

16. The transportation method of claim 14, further comprising:

securing the first end cover, the second end cover, the at least one intermediate cover and the plurality of hot ingots to the base.

17. The transportation method of claim 16, further comprising:

transporting the plurality of hot ingots to a processing facility.

18. The transportation method of claim 17, wherein the plurality of hot ingots arrive at the processing facility hot.

19. The transportation method of claim 17, wherein the plurality of hot ingots comprise aluminum ingots and the aluminum ingots arrive at the processing facility having a temperature of at least 250° F.

20. A transportation system, comprising:

a base;

at least one stack of ingots; and at least one cover positioned over the at least one stack of ingots, wherein the at least one cover comprises:

a first end cover positioned on a first end of the at least one stack of ingots;

a second end cover positioned on a second end of the at least one stack of ingots; and an intermediate cover positioned between the first end cover and second end cover.

\* \* \* \* \*

UNITED STATES PATENT AND TRADEMARK OFFICE
CERTIFICATE OF CORRECTION

PATENT NO. : 10,800,239 B2  
APPLICATION NO. : 16/220944  
DATED : October 13, 2020  
INVENTOR(S) : Eric Paul Ingram Page 1 of 1

It is certified that error appears in the above-identified patent and that said Letters Patent is hereby corrected as shown below:

On the Title Page

In the Assignee item (73): Insert -- Page Transportation, Inc. --

Signed and Sealed this
Eighth Day of December, 2020

Andrei Iancu
*Director of the United States Patent and Trademark Office*